March 19, 1963 G. DARNELL 3,081,494
MOLD REGISTERING AND LOCKING DEVICE
Filed July 9, 1957 2 Sheets-Sheet 1

INVENTOR.
GEORGE DARNELL
BY Amster & Levy
ATTORNEY

March 19, 1963 G. DARNELL 3,081,494
MOLD REGISTERING AND LOCKING DEVICE
Filed July 9, 1957 2 Sheets-Sheet 2
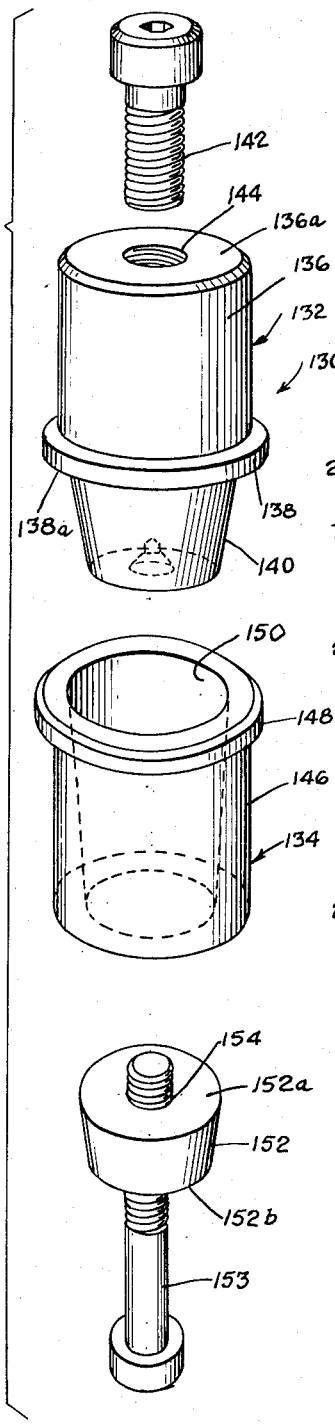
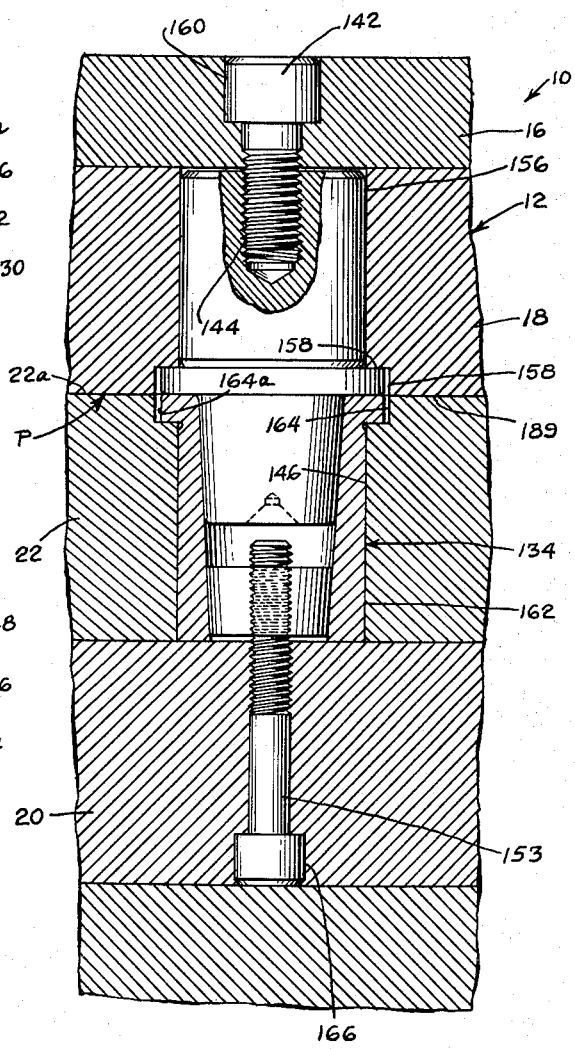
INVENTOR.
GEORGE DARNELL
BY
*Amatto & Levy*
ATTORNEY

United States Patent Office 3,081,494
Patented Mar. 19, 1963

3,081,494
MOLD REGISTERING AND LOCKING DEVICE
George Darnell, Scarsdale, N.Y., assignor to Damac Tool Company, Bronx, N.Y.
Filed July 9, 1957, Ser. No. 670,679
2 Claims. (Cl. 18—44)

The present invention relates generally to improvements in molds for injection molding, and more particularly to an improved mold registry and locking arrangement and method for the assembly of such arrangement in molds for injection molding of plastics.

The familiar injection and compression molding machines incorporate a stationary platen which carries a mold cavity part into which the plastic material is injected, and a movable platen which carries the mold core part into cooperating engagement with the mold cavity part. Conventionally, the mold parts are brought into registry with each other at the meeting and parting plane by the use of leader pins which project from the inner face of one of the mold parts and are accommodated within leader pin bushings on the other of the mold parts. Usually, the leader pin and its bushing both include a shoulder or a head at their rearward ends which serve as stops when assembling the leader pin and bushing from the rearward sides of the respective mold parts. Specifically, the leader pin and the accommodating bushing are assembled from the rear of the mold parts by forming a through bore in each of the mold parts having a counterbore at its rear end, that is, at the end remote from the inner meeting faces of the mold parts. Clearance is provided for a major portion of the respective through bores which receive the leader pin and leader pin bushing to allow for easy insertion into the respective mold parts; and a press fit step is provided contiguous to the respective counterbores and at the sides of the mold parts remote from the parting plane to fix the leader pin and its bushing in position. Both the construction and method of assembly of standard leader pins and bushings contribute to a degree to misalignment between the mold parts. Added to this misalignment is the sidewise movement of the mold parts under injection or compression pressure during the molding operation, which sidewise movement is often increased as a result of flexing of the leader pin. Misalignment between the mold parts results in uneven wall thickness in the molded products and undue wearing of the mold core and cavity parts under injection or compression pressure.

It is broadly an object of the present invention to provide an improved mold registry means which obviates one or more of the aforesaid difficulties. Specifically, it is within the contemplation of the present invention to provide an improved leader pin and leader pin bushing and method for their assembly. Advantageously, my construction and method of assembly assure more perfect alignment of the mold parts and minimize wearing of the mold parts.

A further object of the invention is to provide an improved method and construction for attaining mold registry which appreciably reduces wearing of the injection molding machine and results in substantial improvement in the properties and configuration of the final molded products.

The nature of the problem may be more fully appreciated by considering typical, but illustrative tolerances and clearances when employing conventional leader pins and leader pin bushings. Normally, a diametrical clearance of the order of one to three thousandths is required between the standard leader pin and the accommodating bushing to allow for ease of opening and closing of the mold parts at the parting plane and to prevent binding of the mold parts during the required high speed operation. To this is added an additional clearance of the order of one thousandth brought about by the necessity of assembling the standard leader pins and bushings from the rear side of the respective mold parts. Finally, a movement of the order of fifteen to thirty thousandths of the mold parts relative to each other occurs under injection or compression pressure during the molding operation and as a result of flexing of the pins. Thus, the cumulative error and lateral shifting often become excessive, resulting in molded products of poor quality. Quite separate and apart, the lateral shifting brings about excessive wearing of the molds which occurs as a result of the wiping contact between the mold parts.

I have found that the use of tapered leader pins and corresponding tapered bushings assembled from the inner faces of the mold parts at the parting and meeting plane materially decreases the possibility of misalignment between the mold parts, assures more perfect molding operation, and results in improved quality in the final molded products.

In accordance with an illustrative embodiment demonstrating features of the present invention, my improved mold registry means comprises a leader pin mounted on one mold part having a male plug portion projecting from the inner face of one mold part and a leader pin bushing mounting on the other mold part having a bore opening into the inner face of the other mold part. The male plug portio of the leader pin is of progressively increasing cross section from its leading end toward the inner or confronting face of the one mold part and the bore is of complementary cross section whereby precise registry may be attained between the mold parts when brought together at the meeting and parting plane.

In accordance with method aspects of the present invention, the cooperating mold parts are assembled with their inner faces meeting in a parting plane and a precision bore is reamed in the mold parts at right angles to the parting plane. The mold parts are then separated and the precision bore sections are counterbored on the inner faces of the mold parts. The leader pin, which is formed with a shoulder intermediate its ends, is inserted within the bore section of one mold part with its shoulder seated in the adjacent counterbore. The accommodating bushing, which is formed with a shoulder at its inner end, is inserted into the bore section of the other mold part with its shoulder seated in the adjacent counterbore. By proper reaming of the bore to accommodate the mounting portions of the leader pin and its bushing and appropriate seating of the respective shoulders so that their inner faces are coplanar with the inner faces of the mold parts, extremely precise control may be obtained over the mating of the mold parts, reducing to a minimum the possibility of misalignment.

The above brief description, as well as further objects, features and advantages of the present invention will be more fully appreciated by reference to the following detailed description of presently preferred embodiments and methods of assembly, when taken in conjunction with the accompanying drawing, wherein.

Figure 1:
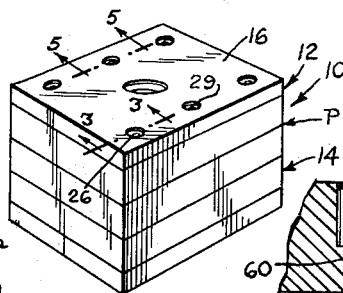
FIG. 1 is a perspective view of a typical mold assembly adapted to incorporate improved corner and intermediate mold registry means in accordance with the present invention.

FIG. 4 is an exploded perspective view of a modified leader pin and associated bushing useful in accordance with the present invention at locations intermediate the corners and where precise mold alignment and orientation is required; and FIG. 5 is a sectional view taken substantially along the line 5—5 of FIG. 1, on an enlarged scale and with parts broken away, showing the details of the modified leader pin and bushing illustrated in FIG. 4 as assembled in the mold.

Referring now specifically to the drawings, there is shown in FIG. 1 a typical mold assembly, generally designated by the reference numeral 10, which includes a cavity or female part 12 and a core or male part 14 which have inner faces confronting and meeting at a parting plane P. The cavity part 12 of the mold 10 is fixed to the stationary platen and receives the material to be injection molded, while the core part 14 is carried by a movable platen which is mounted on tie rods and is periodically moved into and out of cooperating relation with the cavity part 12 of the mold.

Figure 3:
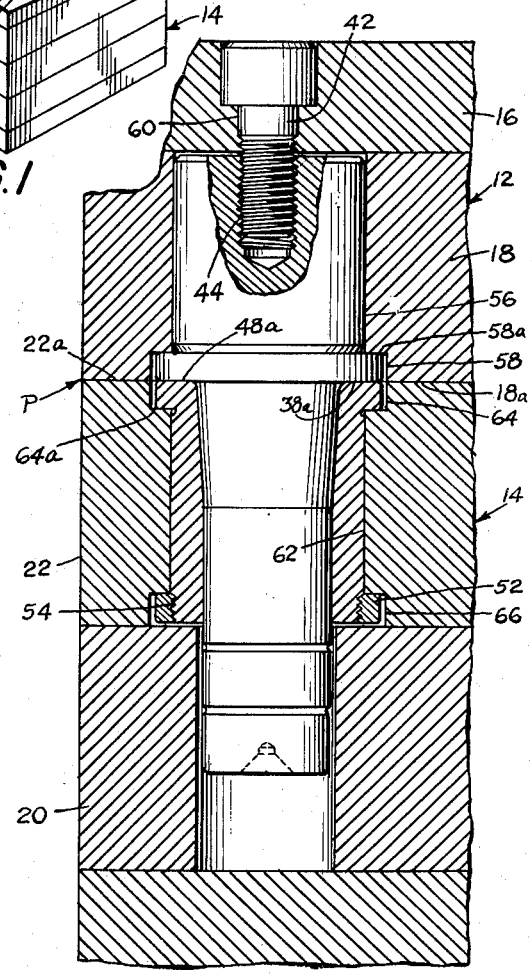
FIG. 3 is a sectional view, on an enlarged scale and with parts broken away, taken substantially along the line 3—3 of FIG. 1 and showing the details of the corner leader pin and associated bushing illustrated in FIG. 2 as assembled in a mold.

As seen in FIGS. 1, 3 and 5, the stationary mold part 12 includes a clamping plate 16 and a block 18 in which the mold cavity is formed. The movable core part 14 of the mold includes a base plate 20 and a block 22 in which the core of the mold is formed. The cavity block 18 and the core block 22 meet at their respective confronting faces 18a, 22a in the parting and meeting plane P of the mold assembly 10.

In accordance with the present invention, improved registry and mold aligning means are provided at the corners (i.e. the corner 26) of the mold 10 and at such locations intermediate the corners (i.e. the location 28) where more perfect mold alignment is required. Detailed reference will now be made to FIGS. 2 and 3 which shows my improved corner registry and mold aligning means and to FIGS. 4 and 5 which show my improved intermediate registry and mold aligning means for the mold 10.

Figure 2:
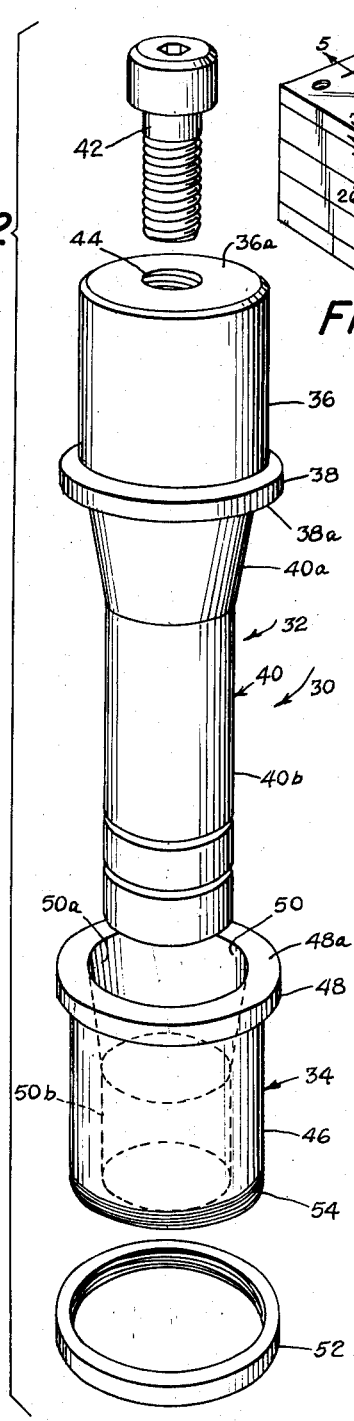
FIG. 2 is an exploded perspective view of a typical leader pin and leader pin bushing, with associated parts, useful in accordance with the present invention at the corners of a mold assembly.

As seen in FIG. 2, the corner-aligning means, generally designated by the reference numeral 30, includes a specially constructed leader pin 32 and a leader pin bushing 34. The leader pin 32 includes a mounting part 36 of generally cylindrical configuration, an annular shoulder 38, and a projecting plug portion 40 including a tapered section 40a and a section of substantially uniform diameter 40b. The leader pin 32 is adapted to be fixed in assembled relation with the cavity part 12 of the mold 10, as will hereinafter be described, by means of the bolt 42 which is adapted to be engaged in the axial tapped hole 44 extending inwardly from the uppermost face 36a of the mounting part 36 of the leader pin 32.

The leader pin bushing 34 includes a generally cylindrical mounting part 46 which terminates at its upper end in an annular flange 48 and is formed internally with a bore 50 which includes a tapered section 50a complementary to the tapeerd plug section 40a and a section of uniform diameter 50b complementary to the plug section 40b. The bushing 34 is fixed in the movable core part 14 of the mold 10 by an internally threaded lock ring 52 which engages the external thread 54 provided on the periphery of the lowermost end of the mounting part 46 of the bushing 34, as will be hereinafter described.

The mold 10 is prepared at its corner to receive the corner aligning and locking pin and bushing assembly 30, 34 in the following manner. The cavity block 18 of the mold part 12 is formed with a through bore 56 which is of a diameter closely conforming (i.e. with a press fit step) to the outside diameter of the mounting part 36 of the leader pin 32. At the end of the bore 56 which opens into the confronting or inner face 18a of the block 18, there is provided a counterbore 58 of a depth selected to accommodate the shoulder 38 with the outer face 38a thereof flush with and lying in a common plane with the inner face 18a of the block 18. By accurately reaming the bore 56 and by accurately counterboring to provide the annular seating surface 58a, the leader pin 32 may be precisely located in the mold part 18 by insertion from the inner side or face 18a. The leader pin 32 is locked in position by the bolt 42 which extends through an appropriate counterbored hole 60 formed in the clamp plate 16 and is engaged in the tapped hole 44 provided axially of the mounting part 36 of the leader pin 32.

The leader pin bushing 34 is accommodated within the movable mold part 14 by forming a precision bore 62 in the core block 22 which bore accommodates the mounting part 46 of the bushing 34 (i.e. with a press fit step). The bore 62 is formed with a counterbore 64 at the end opening into the inner or confronting face 22a of the core block 22. The counterbore 64 provides an annular seating surface 64a which bears against the surface 48a of the annular shoulder 48. The depth of the counterbore 64 is selected so that the upper surface of the annular shoulder 48 lies flush and forms a continuation of the plane of the inner face 22a of the cavity block 22. To precisely locate the bushing 34 within the block 22 it is merely necessary to accurately control the formation of the bore 62 and the depth of the counterbore 64. The bushing 34 is fixed within the bore 62 by insertion of the bushing 34 from the inner side or face 22a of the mold block 22 and engagement of the lock ring 52 on the threaded end 54 of the mounting part 46, 34. To accommodate the locking ring 52, an appropriate counterbore 66 is formed in the bottom or outer face of the block 22.

In a typical but illustrative embodiment, the tapered plug section 40a has a progressively diminishing taper from the shoulder or flange 38 to its lowermost end of between one-quarter of a degree to five degrees and the corresponding section 50a of the bushing 34 is bored to provide a snug fit. This provides the required locking action between the mold parts 12, 14. The uniform diameter section 40b is dimensioned to provide between one and three thousandths diametrical clearance with respect to the receiving bore section 50b and serves to guide the leader pin into its locking position with respect to the bushing and to supplement the action of the snugly fitting sections 40a, 50a.

Further in accordance with the present invention, improved registry and mold aligning means are provided at locations intermediate the corners (i.e. the intermediate locations 28) where the shape or internal construction of the mold requires additional control. Detailed reference will now be made to FIGS. 4 and 5 which show my improved intermediate registry and mold aligning means. As seen in FIG. 4, the intermediate mold aligning means, generally designated by the reference numeral 130, includes a specially constructed leader pin 132 and a leader pin bushing 134. The leader pin 132 includes a mounting part 136 of generally cylindrical configuration, an annular shoulder 138, and a projecting male or plug portion 140 of diminishing tapered section from the shoulder 138 toward its foremost end. The leader pin 132 is fixed in assembled relation with the cavity part 12 of the mold, as will hereinafter be described, by means of a bolt 142 which is adapted to be engaged in the axial tapped hole 144 extending inwardly from the uppermost face 136a of the mounting part 136 of the leader pin 132.

The leader pin bushing 134 includes a generally cylindrical mounting part 146 which terminates at its upper end in an annular flange 148 and is formed internally with a bore 150 which is of tapered section complementary to the tapered plug portion 140. The bushing 134 is fixed in the movable core part of the mold 10 by a locking plug 152 which is engaged within the bore 150 and drawn down into locking position by a bolt 153 engaged within a tapped hole 154 in the locking plug 152. The locking plug 152 is of a diminishing taper from its upper end face 152a toward its lower end face 152b and is adapted to conform to and seat within the lowermost portion of the tapered bore 150 of the leader pin bushing 134.

The mold 10 is prepared at its intermediate location to receive the intermediate aligning and locking pin and bushing assembly 130, 134 in the following manner. The cavity block 18 of the mold part 12 is formed with a through bore 156 which is of a diameter closely conforming to the outside diameter of the mounting part 136 of the leader pin 132. At the end of the bore 156 which opens into the confronting or inner face 18a of the block 18 there is provided a counterbore 158 of a depth selected to accommodate the shoulder 138 with the outer or under face 138a lying flush and in a common plane with the face 18a of the block 18. By accurately reaming the bore 156 and by accurately counterboring to provide the annular seating surface 158a at the prescribed depth, the leader pin 130 may be precisely located in the mold part 18 by insertion from the inner side or face 18a of said mold part. The leader pin 132 is locked in position by engaging the bolt 142 in the threaded tapped hole 144, the bore being seated in an appropriate counterbored hole 160 formed in the clamp plate 16.

The leader pin bushing 134 is accommodated within the movable mold part 14 by forming a precision bore 162 in the core block 22 which precision bore accommodates the mounting core 146 of the bushing 134. The bore 162 is formed with the counterbore 164 at the end opening into the inner face 42a of the core block 42. The counterbore provides an annular seating surface 164a for the shoulder 148. The bushing 134 is fixed within the bore 162 by insertion of the bushing from the inner side of face 22a of the mold block, followed by the insertion within the tapered bore 150 of the complementary tapered locking plug 152. Thereupon, the bolt 153 is engaged through an appropriated counterbored hole 166 in the base 22 which bolt 153 is engaged within the tapped hole 154 axially of the locking plug 152. Upon tightening down on the bolt 153, the locking plug 152 is drawn downwardly to fix the bushing 134 with a wedging action in its accommodating bore 162.

The plug portion 140 has a progressively diminishing taper from the shoulder or flange 138 to its lowermost end of between one quarter of a degree to five degrees; and the corresponding bore 150 is dimensioned to provide a snug fit with the required locking action between the mold parts 12, 14.

From the foregoing it will be seen that there is provided in accordance with the present invention improved means whereby the registry between mold parts may be made more precise, thereby minimizing wear on the molding apparatus and on the mold parts and resulting in molded parts of improved quality.

The nature of the method of assembly is such that close tolerances be maintained with but simple shop operations, for accurate mold registry herein is governed by the formation of precision reamed bores and counterbores. The component parts used for mold registry at the corners and at intermediate locations are virtually identical and accordingly their manufacture is materially simplified.

The overall approach herein is one of attaining a high degree of accuracy in mold registry with uncomplicated means and a simple method of assembly. In fact, the leader pins and their respective bushings may be employed constructing and fitting mold parts whereby a high degree of precision may be obtained from beginning to end of the mold manufacture and assembly operation.

A latitude of modification, change and substitution will occur to those skilled in the art and in some instances some features of the invention will be used without a corresponding use of other features. Accordingly, it is appropriate that the appended claims be construed broadly in accordance with the scope of the invention herein.

I claim:
1. An improved mold assembly comprising a first and second mold section having respective first and second confronting faces which meet along a parting plane, a first alignment bore having a counterbore formed in said first mold section perpendicular to said first confronting face, a second alignment bore having a counterbore formed in said second mold section coaxial to said alignment bores and extending inwardly into said first and second mold sections respectively from said confronting faces, alignment means positioned within said bores for accurately positioning said first mold section with respect to said second mold section, said alignment means including a leader pin having a mounting shoulder intermediate its ends of a diameter greater than the diameter of said first alignment bore and adapted to be received within said first counterbore, a cylindrical mounting section of a diameter complementary to the diameter of said first alignment bore extending in one direction from said mounting shoulder and coaxial therewith, a tapered aligning section projection from said mounting shoulder in the other direction and coaxial therewith, and a cylindrical aligning section extending coaxially therefrom, a leader pin bushing having an external cylindrical bushing-locating surface of a diameter complementary to the diameter of said second alignment bore, a bushing-mounting shoulder at one end of said bushing of a greater diameter than said bushing-locating surface and adapted to be received within said second counterbore, an internal tapered aligning surface of a diameter and taper complementary to said leader pin tapered aligning section and adapted to intimately receive same, and an internal cylindrical aligning surface extending from and coaxial with said tapered aligning section complementary to said cylindrical aligning section and adapted to intimately receive same, said leader pin being received within said first alignment bore with said cylindrical mounting section providing positive transverse locating means for said leader pin and said mounting shoulder received within said first counterbore providing positive locating means to axially position said leader pin with respect to said parting face, said leader pin bushing being received within said second alignment bore with said bushing-locating surface engaged within said second alignment bore providing transverse locating means for said leader pin bushing and with said bushing-mounting shoulder received within said second counterbore providing positive means to axially locate said leader pin bushing with respect to said second confronting face, and securement means for securing said leader pin and said leader pin bushing to said first and second mold sections respectively and to seat said mounting shoulders within said counterbores, said leader pin and bushing providing means for the accurate interalignment of said first and second mold sections.

2. An improved mold assembly comprising a first and second mold section having respective first and second confronting faces which meet along a parting plane, a first alignment bore having a counterbore formed in said first mold section perpendicular to said first confronting face, a second alignment bore having a counterbore formed in said second mold section coaxial to said first alignment bore, said counterbores being coaxially of said alignment bores and extending inwardly into said first and second mold sections respectively from said confronting faces, alignment means positioned within said bores for accurately positioning said first mold section with respect to said second mold section, said alignment means including a leader pin having a mounting shoulder intermediate its ends of a diameter greater than the diameter of said first alignment bore and adapted to be received within said first counterbore, a cylindrical mounting section of a diameter complementary to the diameter of said first alignment bore extending in one direction from said mounting shoulder and coaxial therewith, and a tapered aligning section projection from said mounting shoulder in the other direction and coaxial therewith, a leader pin bushing having an external cylindrical bushing-locating surface of a diameter complementary to the diameter of said second alignment bore, a bushing-mounting shoulder at one end of said bushing of a greater diameter than said bushing-locating surface and adapted to be received within said second counterbore, and an internal tapered aligning surface of a diameter and taper complementary to said leader pin aligning section and adapted to intimately receive same, and of a length greater than the length of said leader pin aligning section, said leader pin being received within said first alignment bore with said cylindrical mounting section providing positive transverse locating means for said leader pin and said mounting shoulder received within said first counterbore providing positive locating means to axially position said leader pin with respect to said parting face, said leader pin bushing being received within said second alignment bore with said bushing-locating surface engaged within said second alignment bore providing transverse locating means for said taper pin bushing and with said bushing-mounting shoulder received within said second counterbore providing positive means to axially locate said leader pin bushing with respect to said second confronting face, leader pin securement means at the end of said leader pin remote from said aligning section for securing same to said first mold section and to firmly seat said leader pin mounting shoulder within said first counterbore, and leader pin bushing securement means at the end of said bushing remote from said bushing mounting shoulder for securing said bushing to said second counterbore comprising a locking plug having an axially tapped hole and a tapered, aligning surface-contacting outer surface, a bolt having threads complementary to said locking plug hole, and an opening formed in said second mold section to receive said bolt, said leader pin and bushing providing means for the accurate interalignment of said first and second mold sections.

References Cited in the file of this patent

UNITED STATES PATENTS

| | | |
|---|---|---|
| 2,079,393 | Benge | May 4, 1937 |
| 2,103,344 | Stuck et al. | Dec. 28, 1937 |
| 2,439,138 | Kohrman | Apr. 6, 1948 |
| 2,704,861 | Zumeta | Mar. 29, 1955 |
| 2,710,990 | Halstead et al. | June 21, 1955 |
| 2,769,230 | Nystrom | Nov. 6, 1956 |

OTHER REFERENCES

"Notes on the Selection of Dowels and Guide Pins for Plastics Molds," British Plastics and Moulded Products Trader, July 1940, 3 pp., page 57.